(12) United States Patent
Dubrulle

(10) Patent No.: US 10,654,571 B2
(45) Date of Patent: May 19, 2020

(54) SYSTEM COMPRISING A DRONE AND AN ENTITY FOR CONTROLLING THIS DRONE

(71) Applicant: SAFRAN ELECTRONICS & DEFENSE, Boulogne Billancourt (FR)

(72) Inventor: Sébastien Dubrulle, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/306,102

(22) PCT Filed: May 29, 2017

(86) PCT No.: PCT/EP2017/062936
§ 371 (c)(1),
(2) Date: Nov. 30, 2018

(87) PCT Pub. No.: WO2017/207511
PCT Pub. Date: Dec. 7, 2017

(65) Prior Publication Data
US 2019/0135435 A1    May 9, 2019

(30) Foreign Application Priority Data
Jun. 2, 2016 (FR) ...................... 16 55044

(51) Int. Cl.
*B64C 39/02* (2006.01)
*G08C 17/02* (2006.01)
*G05D 1/00* (2006.01)
*G05D 1/10* (2006.01)

(52) U.S. Cl.
CPC .......... *B64C 39/024* (2013.01); *G05D 1/0022* (2013.01); *G05D 1/101* (2013.01); *G08C 17/02* (2013.01); *B64C 2201/146* (2013.01); *G08C 2201/30* (2013.01); *G08C 2201/51* (2013.01)

(58) Field of Classification Search
USPC .............................................. 701/2
See application file for complete search history.

(56) References Cited

U.S. PATENT DOCUMENTS

2014/0303884 A1* 10/2014 Levien ............... G08G 5/04
 701/301
2015/0160658 A1* 6/2015 Reedman ............... G05D 1/102
 701/3

(Continued)

*Primary Examiner* — Tyler D Paige
(74) *Attorney, Agent, or Firm* — Muncy, Geissler, Olds & Lowe, P.C.

(57) ABSTRACT

A system includes a drone including an onboard entity; and a control entity for controlling the drone and situated remotely from the drone. The control entity enables an operator to select data for sending to the onboard entity, the onboard entity being adapted to execute actions as a function of the received data. The onboard entity is arranged to generate a message on the basis of the data as produced by the control entity and as received by the onboard entity, and to transmit the message to the control entity. The control entity acts via warning means to generate an information signal representative of said message. The operator can then act via validation means to cause an intention message to be transmitted that authorizes or does not authorize execution of said actions by the drone.

9 Claims, 2 Drawing Sheets

(56) References Cited

U.S. PATENT DOCUMENTS

| | | | |
|---|---|---|---|
| 2015/0273693 A1* | 10/2015 | Cohen | B25J 9/1661 |
| | | | 700/253 |
| 2016/0076892 A1* | 3/2016 | Zhou | B64C 39/024 |
| | | | 701/3 |
| 2016/0117853 A1* | 4/2016 | Zhong | B64C 39/024 |
| | | | 345/634 |
| 2016/0285863 A1* | 9/2016 | Canavor | H04L 63/0823 |
| 2017/0278410 A1* | 9/2017 | Byers | B64C 39/024 |

* cited by examiner

SYSTEM COMPRISING A DRONE AND AN ENTITY FOR CONTROLLING THIS DRONE

The invention relates to the field of systems comprising a drone and a drone control entity, and also to the field of methods of communication between such a drone and the drone control entity.

BACKGROUND OF THE INVENTION

A system is known that comprises a drone having an onboard entity on board said drone, and a drone control entity situated remotely from the drone. The control entity is connected to a human-machine interface adapted to enable an operator to select data for sending from the control entity to the onboard entity. The onboard entity is suitable for receiving data sent by the control entity and for executing actions as a function of the data received in this way by the onboard entity.

It has been observed that under certain circumstances the drone can carry out actions that are catastrophic for its own safety and for the safety of its surroundings.

In order to make the system safe, elements and/or components of the system need to be certified in compliance with criticality standards. Certification operations are useful, but expensive.

OBJECT OF THE INVENTION

An object of the present invention is to provide a system and a communication method of the above-specified type that makes it possible to satisfy at least some of the above-mentioned problems.

SUMMARY OF THE INVENTION

To this end, the invention provides a system comprising a drone having an onboard entity on board said drone and a control entity for controlling the drone and situated remotely from the drone, the control entity being connected to a human-machine interface adapted to enable an operator to select data for sending from the control entity to the onboard entity. The onboard entity is adapted to receive the data sent by the control entity (this sent data being, at least in part, representative of the data selected by the operator) and to execute actions as a function of the data as received in this way by the onboard entity.

The system of the invention is essentially characterized in that:

the onboard entity is arranged to generate a message from the data received by the onboard entity and to transmit this message to the control entity; and the control entity is arranged to control warning means to generate an information signal representative of said message transmitted by the onboard entity and received by the control entity;

the system further comprising validation means connected to the control entity, the control entity also being arranged to act as a function of the operator acting on said validation means after said information signal S has been generated in order to transmit an intention message to the onboard entity; and the onboard entity being arranged to make execution of said actions conditional as a function of said intention message.

In order to understand the invention, the term "connected" as used in the present application implies a link enabling data, signals, and/or messages to be transferred, so the link is not necessarily mechanical via a transmission cable, but could equally well be wireless, e.g. via a radio link.

In the event of a failure of the human-machine interface, or in the event of the operator making an erroneous selection, there is a risk that the selected data will be corrupted or erroneous, which can lead to corrupted and/or erroneous data being transmitted to the onboard entity. There would be a risk of the drone malfunctioning if the onboard entity were to execute actions resulting from corrupted or erroneous data.

By means of the invention, a message is generated by the onboard entity from the data that it receives from the control entity. The message is then transmitted to the control entity, which causes an information signal representative of the message to be generated, i.e. a signal representative of the content of the message.

The operator is informed by this information signal and can then act on validation means that are connected to the control entity.

As a function of this operator action on the validation means, the control entity generates and transmits an intention message, which is transmitted to the onboard entity. The intention message is representative of the intention of the operator concerning the question as to whether or not the operator desires execution of the actions that correspond to the information message.

The onboard entity makes execution of the actions conditional on receiving the intention message.

The system of the invention, in the same manner as the method of the invention, serves to transmit instructions and/or data selected by the operator to a drone while limiting the risk of the drone executing actions that are inconsistent or erroneous, since the user has the possibility of validating the actions if the operator considers that the information signal received is indeed consistent with the data that was previously selected by the operator.

Receiving this intention message makes it possible, as appropriate, to validate or cancel the instructions and/or data previously transmitted to the drone, which amounts to using the intention message as a prior condition for executing the corresponding actions.

If the onboard entity does not receive the intention message it does not authorize execution of the actions. This makes the system safe.

Furthermore, as explained below, the system of the invention is advantageous in that it makes it possible to limit the cost of certifying the system. Specifically, because of the invention, the human-machine interface and the warning means do not need to be elements that are certified in compliance with a criticality standard, thereby limiting the cost of developing and fabricating the system by reducing the number and the complexity of the elements of the system that need to be certified. For example, the warning means may comprise an audio headset and/or IP voice generator means and/or a visual display, e.g. serving to display text constituting the text-type information signal. Depending on the selected embodiment, the warning means may be certified or not certified.

In an another aspect, the invention also provides a method of communication between a control entity for controlling a drone and situated remotely from the drone, and an onboard entity on board said drone, the control entity being connected to a human-machine interface in order to enable an operator to select data for sending from the control entity to the onboard entity, the onboard entity on board the drone being adapted to receive the data sent by the control entity (this sent data being, at least in part, representative of the data selected by the operator) and to execute actions as a function of the data as received in this way by the onboard entity.

The method of the invention is essentially characterized in that prior to executing said actions:

the onboard entity transmits a message to the control entity, the message being generated from the data received by the onboard entity; then the control entity controls warning means to generate an information signal for the attention of the operator, the information signal being representative of said message transmitted by the onboard entity and received by the control entity; then the control entity transmits an intention message to the onboard entity as a function of an action by the operator on validation means connected to the control entity; and then the onboard entity makes execution of said actions that are functions of said data previously received by the onboard entity conditional as a function of said intention message.

The method of the invention presents the same advantages as those mentioned above with reference to the system of the invention.

In a particular implementation of the communication method of the invention, the human-machine interface comprises:

selection means selected from hand-controlled selection means and voice-controlled selection means; and at least one display means for displaying the data selected using the human-machine interface; and the warning means include at least one loudspeaker for delivering said information signal for the attention of the operator, the information signal being a text-type signal or an audio-type signal.

As explained in detail below, the fact of having visual display means for displaying the selected data and also warning means for delivering the text- and/or audio-type information signal representative of the data contained in the message as received by the onboard entity enables the operator to compare the displayed data (i.e. the data selected by the operator) with the data of the information signal, which the operator reads via the visually displayed text or hears via the loudspeaker (this text- or audio-type information signal is representative of the data as received and as interpreted by the onboard entity).

This makes it easier to detect corruption, if any, of the data between the data being selected and the data being interpreted by the onboard entity. It is also possible for the information signal to be both of text type and of audio type.

The visual text display may be dedicated solely to displaying the information signal, or if necessary it may be incorporated in the display means of the human-machine interface as described below under "Detailed description of the invention".

In another implementation of the communication method of the invention, the control entity, the onboard entity, and the validation means are selected so as to be certified in compliance with at least one criticality standard, while the human-machine interface and the warning means are not certified in compliance with said at least one criticality standard.

This implementation is advantageous since it makes it possible to limit the cost and the effort that needs to be deployed for certifying the system, but without that comprising the function of detecting potential corruption of data in the system. Specifically, in this example, there is no need to certify the human-machine interface or the warning means, which can then be standard elements of low cost.

BRIEF DESCRIPTION OF THE DRAWING

The invention can be better understood in the light of the following description of the invention, given with reference to the accompanying figures, in which.

DETAILED DESCRIPTION OF THE INVENTION

Figure 1:
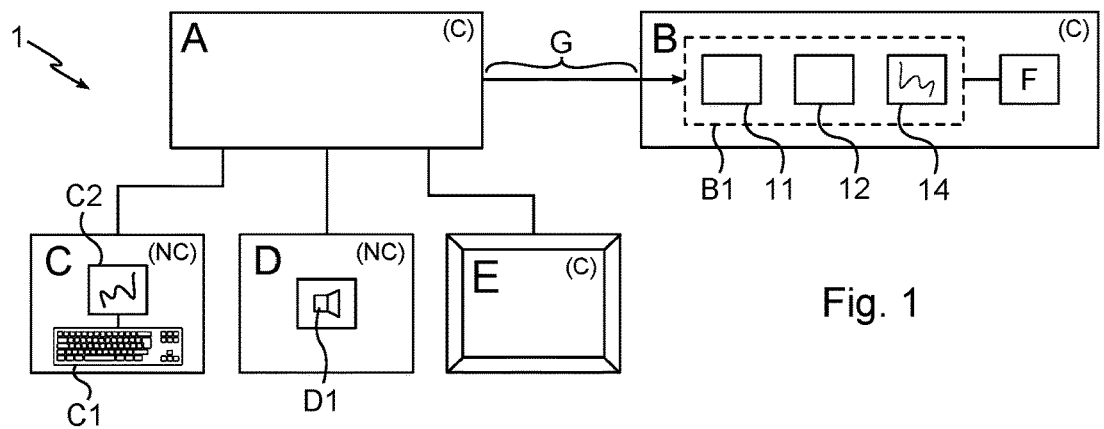
FIG. 1 describes the system of the invention having a drone and a control entity that communicate with each other via signals that are preferably radio signals.

As mentioned above, the invention relates essentially to a system 1 as shown in FIG. 1 and comprising:

a drone B having an onboard entity B1 on board said drone B; and a control entity A for controlling the drone and situated remotely from the drone B.

The control entity A and the onboard entity B1 of the drone B communicate with each other via a data transfer system G represented by a data transfer line. This data transfer system may comprise a communications card belonging to the control entity A, a communications card belonging to the onboard entity B1, and a cable for transferring data that connects the communications cards together. Alternatively, in a wireless data transfer embodiment, the communications cards may be configured to communicate with each other via electromagnetic waves.

The control entity A is connected to a human-machine interface C.

The human-machine interface C preferably comprises:

selection means C1 selected from hand-controlled selection means such as a keyboard or a pointer device for a computer, or voice-controlled selection means; and at least one display means C2 such as a display screen for displaying the data 10 as selected using the human-machine interface C.

The human-machine interface C is adapted to enable the operator to select data 10 for sending from the control entity A to the onboard entity B1.

The data selected by the operator may be data for influencing a change in the position or the path of the drone, or data that is critical for various flight functions of the drone.

By way of example, such data may include a position to be reached by the drone, such as an altitude or three-dimensional coordinates, or a path to be followed by the drone. This data could also be of some other type.

The data is critical in the sense that if it is executed by the onboard entity without being validated by the operator, it could lead to an action that is catastrophic for the drone.

The data is sent using the data transfer system G. The data may be critical data, such as an order to move the drone to a given point and/or to follow a path. The term "critical data" is used to mean data that has the potential to endanger the drone or its surroundings if the data is executed by actuators F of the drone B.

The onboard entity B1 of the drone is adapted to receive at least some of said data 10 sent by the control entity and to execute actions as a function of the data 10 as received in this way by the onboard entity B1. Such actions may be moving control surfaces or blades or wheels enabling the drone to be moved in full or in part.

On the basis of the data 10 transmitted by the control entity A and received by the onboard entity B1, the onboard entity B1 generates a message 20 and transmits it to the control entity A. The message 20 is transmitted using said data transfer system G.

The control entity A controls warning means D to which it is connected so as to generate an information signal S representative of said message 20 as transmitted by the onboard entity B1 and received by the control entity A.

This information signal S is brought to the attention of the operator, and by using validation means E that are also connected to the control entity A, the operator can interact with the control entity as a function of the information signal S that the operator has just heard.

As a function of the operator acting on said validation means E after said information signal S has been generated, the control entity A transmits an operator intention message 21 to the onboard entity B1, which message in this example is a validation message. In the same manner as above, the message 21 is transmitted via the data transfer system G.

In another particular embodiment, as a function of the operator acting in a different manner on said validation means or on the human-machine interface C, the control entity A may send to the onboard entity B1 an intention message 21 that is a cancel message.

The onboard entity B1 is arranged to make execution of actions by the actuators F of the drone conditional as a function of the intention message 21. These actions are the result of the actuators F executing at least some of the data 10 previously selected by the operator and then sent to the onboard entity B1 by the control entity A.

Having the operator validate or not validate execution of actions by the actuators F of the drone is advantageous since this enables the operator to be sure that the actions that are to be performed have been properly interpreted by the drone and that there has been no data selection error or data corruption between selection and interpretation by the onboard entity B1.

Preferably, the warning means D comprise at least one loudspeaker D1 for delivering said information signal S representative of said message 20 to the operator, with the information signal S in this example being an audio-type signal.

The fact that the human-machine interface C includes a display C2 for displaying the selected data 10, while the warning means include at least one loudspeaker D1 for delivering the audio information signal S, enables the operator to have simultaneously both an image displaying the selection made by the operator, and also a sound signal S giving the operator a result of the onboard entity B1 interpreting data 10 as selected at the control entity A. This makes it easier for the operator to compare and/or verify consistency in the data since the operator can concentrate visual attention on the actions of selecting the data 10 and auditory attention solely on the question of validating or canceling the data as interpreted by the onboard entity B1.

The warning means D may include a text display for delivering said signal S representative of said message 20 to the operator, with the information signal S then being a text-type signal.

Since the message 20 transmitted by the onboard entity B1 is in a format that is different from the signal S, of audio type and/or of text type, as delivered to the operator, this involves a change of format between the message 20 and the information signal S that is delivered. If the data is corrupted, the information signal S as delivered is either incomprehensible or else absent. The operator can thus detect corrupted data and can decide not to validate execution of the corresponding actions.

This serves to reduce any risk of erroneous interpretation by the operator. It would be difficult for the operator to perceive two display zones of different kinds and presenting the same data, and this does not happen when combining the display of the data 10 with the delivery of the audio-type and/or text-type signal S.

Ideally, the control entity A includes an interpretation device arranged to interpret the message 20 as generated by the onboard entity B1, and to deliver an interpreted signal Si to the warning means D, e.g. a text-type message. The information signal S representative of the message 20 transmitted by the onboard entity B1 is a signal of text type (or in the form of text) and/or an audio signal of voice type. This information signal S is the result firstly of the message 20 being interpreted by the interpretation device 13 and secondly of interpretation of the interpreted signal Si by the warning means.

The system of the invention may also include a voice synthesis device, preferably installed in the warning means D, so as to take the text-type interpreted signal Si and synthesize the audio information signal S. This information signal S is then an audio voice message.

The information signal S is made up of words forming a (text and/or audio) message representative of the data 10 as selected by the operator and as interpreted by the onboard entity B1. By way of example, the message gives a position to be reached by the drone, or a path to be followed by the drone, or an action to be executed.

Since the warning means deliver a signal S of text type and/or of audio voice type coming from the interpretation device, the signal is made up of distinct words that are semantically rich. Such a semantically rich message serves to eliminate the need to certify the warning signal, since the richness of speech is such that it is not possible to corrupt a word having one meaning in such a manner as to create another word having another meaning. Consequently, it is extremely advantageous to use an interpretation device for increasing the overall safety of the system.

Advantageously, the voice synthesis device may also be used to give information about the current state of the drone, on the basis of current state messages delivered by the onboard entity to the control entity. Under such circumstances, the warning means are used to inform the operator:

firstly of actions that remain to be executed if they are validated, these actions being a function of the data 10 previously selected by the operator; and secondly the current state of the drone, such as its present position or its on-going path or its target destination.

The operator can thus verify consistency with a state displayed on the human-machine interface C (for example the operator can verify consistency between the current state of the drone and the forthcoming actions), and the operator can then either validate the forthcoming actions by acting on the validation means, or else start a specific procedure (e.g. selecting new data by acting on the human-machine interface C).

The control entity A, the onboard entity B1, and the validation means E are preferably certified (C) in compliance with at least one criticality standard, while the human-machine interface C and the warning means D are not certified in compliance with this at least one criticality standard.

In the field of aviation, certain elements of a system may be considered as being critical elements that can present a catastrophic risk.

In order to ensure some minimum level of safety, critical elements are developed and tested so as to be certified as complying with standards such as international standards.

In the present example, said at least one criticality standard comprises:
the standard DO-178, which sets safety conditions applicable to critical avionics software in commercial aviation and general aviation; and
the standard DO-254, which specifies in particular the constraints on development associated with obtaining certification for electronic avionics equipment.

Standardizing an element is particularly lengthy and expensive. Certified elements are identified in the figures by the mention (C) and non-certified elements by the mention (NC). The term "non-certified" is used to mean not certified to catastrophic level.

As mentioned above, the invention is particularly advantageous in that it enables the operator to decide whether or not to validate the data previously received by the onboard entity B1, thereby reducing the criticality of the human-machine interface.

Consequently, the human-machine interface C need not be certified or need not be certified to catastrophic level (development assurance level (DAL) A or DAL B or DAL C depending on the specifications of the authorities and the context of use), thus making it possible to reduce its cost price and its technical complexity.

By means of the invention, it is possible to use a human-machine interface C that is not certified (NC) and that is therefore of lower cost.

The same applies to the warning means D, which are likewise not critical (NC) for the safety of the system 1. Specifically, in the event of the warning means D malfunctioning, the message generated by the onboard entity B1 will not be received by the operator. The operator will then not perform the validation action and no intention message will be transmitted. The onboard entity B1 will not authorize execution of the actions corresponding to the data 10 previously selected by the operator.

Thus, the risk of executing an erroneous or inconsistent action continues to be reduced.

Furthermore, if the operator observes that the warning means do not generate a signal S in response to a prior selection of data, the operator will then deduce that one of the non-certified elements of the system has failed. It can be replaced at reduced cost.

Since, prior to validating execution, the system of the invention makes it possible to verify that the selected critical data has not been corrupted, it reduces critical risks for the drone. The system can thus be certified to a catastrophic level even if some of its elements are not (human-machine interface C or warning means D).

Preferably, the control entity A also includes a verification device 15 arranged to verify the digital and semantic integrity of the data 10 selected by the operator by using the human-machine interface. Digital integrity verification may be performed using a checksum function and semantic verification may be performed using semantic rules for verifying semantic consistency. Preferably, the onboard entity B1 also includes a verification device 11 arranged to verify the digital and semantic integrity of the data received by the onboard entity B1. In this example, data verification is performed by the verification device 11 that is integrated in the onboard entity B1. This verification serves to detect corruption of the message that might occur, e.g. during data transmission.

Ideally, the onboard entity B1 includes storage means 12 for storing the data as received and sent by the control entity A. This data is stored using the storage means 12 while waiting for validation by action on the validation means E.

The operation of the system of the invention is described below, this operation being in accordance with the communication method of the invention.

As can be seen in particular in FIGS. 2a, 2b, 2c and 3, the data 10 is selected by the operator using the human-machine interface C.

Ideally, the selected data is verified using the verification device 15 forming part of the control entity A.

Optionally, data verification by the verification device 15 may be associated with changing the format of the data 10 so as to ensure that the data has indeed been verified by the control entity A. The data 10 thus passes in this example from a first format to a second format.

In the event of this verification by the verification device 15 failing, the data 10 is not transmitted and a failure message can be generated via the warning means D and/or the human-machine interface C.

In the event of the verification succeeding, the data 10 is sent by the control entity A to the onboard entity B1 of the drone B. This sending takes place via the data transfer system G.

On the onboard entity B1 receiving this data 10, the data 10 may firstly be verified by the verification device 11 and secondly be stored by the storage means 12 for storing the data 10 and forming part of the onboard entity B1.

This storage may optionally be conditional on prior successful verification by the verification device 11.

In the event of the data being verified by the onboard verification device 11, this verification may be associated with a change in the format of the data 10 in order to ensure that the data has indeed been verified.

In the onboard entity B1, the data 10 passes from the second format to a third format. It should be observed that it is possible to have only one verification by the verification device 15 of the control entity B1, or alternatively by the verification device 11 of the onboard entity B1.

Figure 2A:
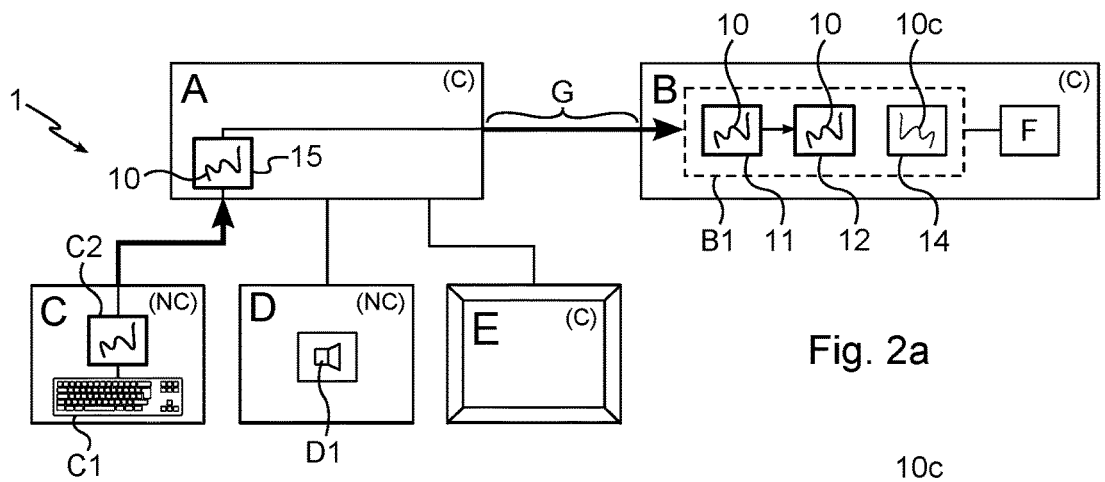
FIG. 2a shows a first step of the method of communication between the control entity and the drone in which the control entity transmits data to the drone, which data is representative of data previously selected by an operator using a human-machine interface.
Figure 2B:
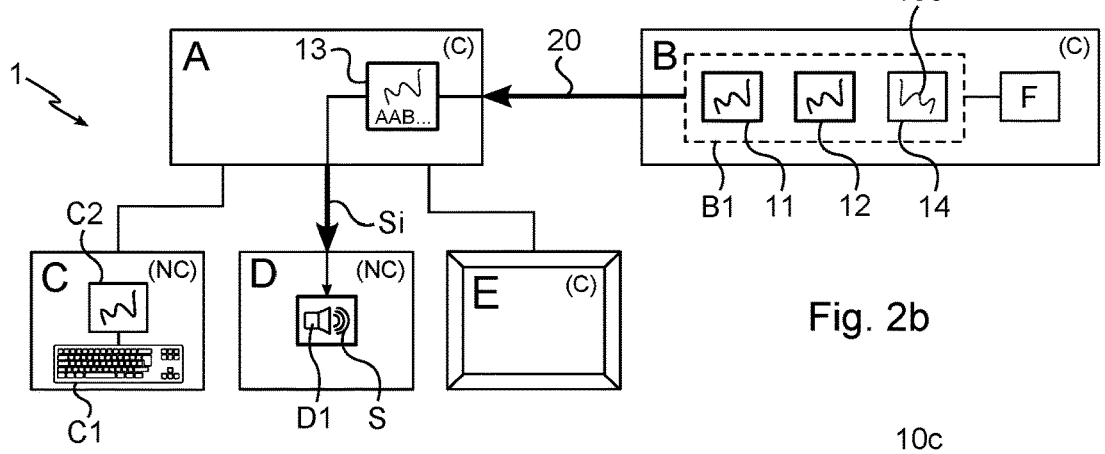
FIG. 2b shows a second step of the communication method of the invention in which the onboard entity on the drone transmits a message to the control entity in response to and as a function of the data previously received by the onboard entity and coming from the control entity.

As shown in FIG. 2b, the onboard entity B1 generates a message 20 from the data 10 that it has received. In the particular situation in which verification and/or format change are performed by the onboard entity B1, the message 20 may be generated on the basis of data that has previously been verified and converted into a new format by the onboard entity B1. This message 20 is then transmitted from the onboard entity B1 to the control entity A via the transfer system G.

The message 20 is received by the control entity A where it can be verified, optionally using a second verification device forming part of the control entity A.

In the event of this verification failing, a failure message may be generated via the warning means D and/or via the human-machine interface C.

In the event of this verification succeeding, the message 20 is sent to the interpretation device 13 which interprets it and transforms it into words constituting the interpreted signal Si. The voice synthesis device in the warning device D synthesizes the interpreted signal Si vocally and delivers an audio voice signal S via the loudspeaker D1. It should be observed that in a particular implementation, during the verification of the message 20 by the second verification device, the format of the message 20 may be modified. The message 20 may also be stored in one or more of these formats in storage means located in the control entity A and/or connected to the control entity, e.g. installed in the human-machine interface C.

The interpretation device interprets the message 20 as converted into the new format, referred to as the "fourth" format. The signal Si as interpreted by the interpretation device 13 is then transmitted to the warning means D, which generates the information signal S made up of a plurality of words in the language of the operator. For this purpose, the warning means D may include a text display for displaying the information signal S in text form and/or may include a voice synthesis device for taking the interpreted signal Si and synthesizing the signal S in audio voice form for delivery via the loudspeaker D1.

Alternatively, it is also possible not to use any second verification device in the control entity A. Under such circumstances, the message 20 may be transmitted unchanged, or may optionally be subjected to format conversion to a fourth format and be sent to the interpretation device 13. The interpretation device 13 then interprets the message 20, possibly as converted into the fourth format, and generates the interpreted signal Si, which is transmitted to the warning means D. The warning means D then generate said information signal S, which includes words representative of the data 10 contained in the message 20.

Figure 2C:
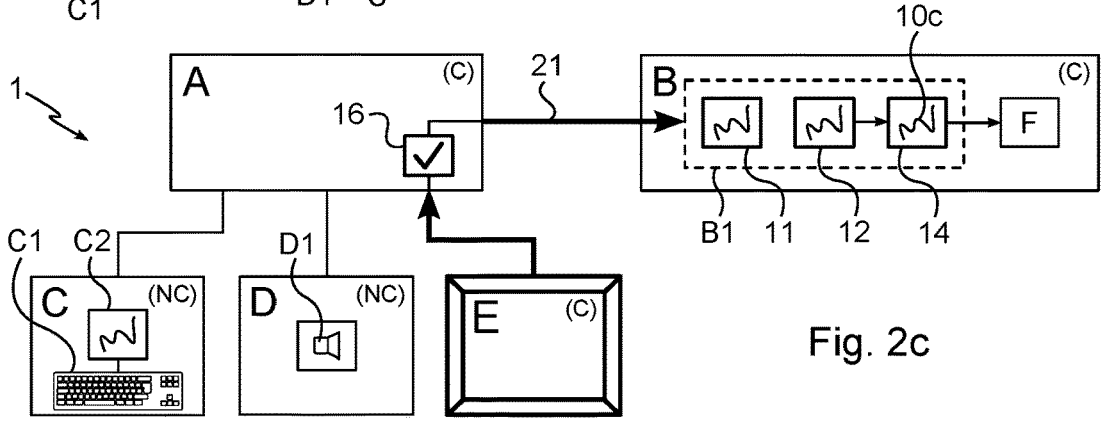
FIG. 2c shows a third step of the method of the invention in which, after reading the text-type message and/or hearing an audio-type signal representative of the message previously transmitted by the onboard entity and after validation by the operator, the control entity transmits an intention message to the onboard entity, which then validates execution of actions by actuators of the drone and the flight control system.
Figure 3:
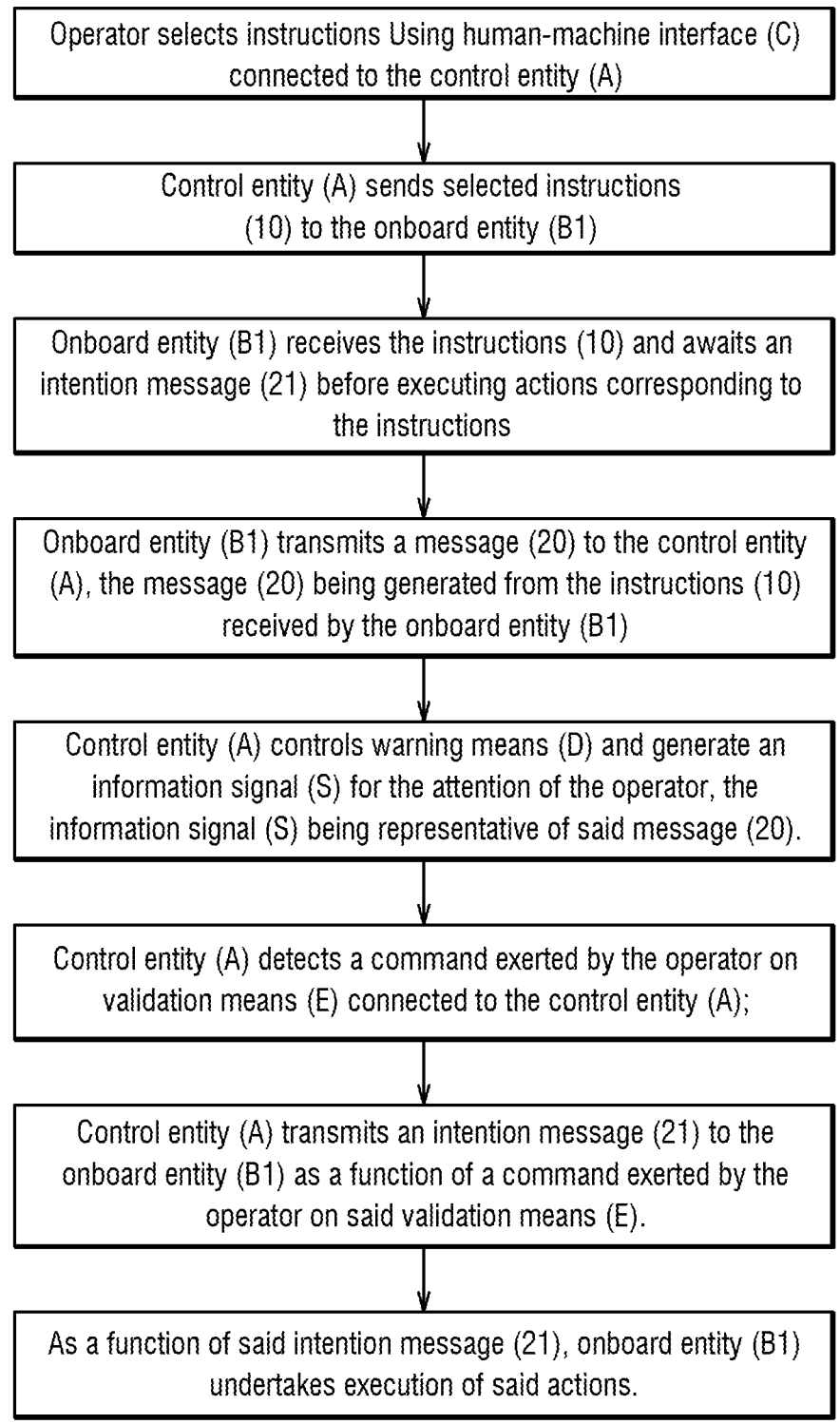
FIG. 3 is a flow chart illustrating the method of communication between the control entity and the drone.

As shown in FIGS. 2a, 2b, and 2c, the current critical data 10c, i.e. the ongoing data that might be executed by the actuators F of the drone without requesting prior validation from the operator, can be stored in current storage means 14 forming part of the onboard entity B1.

This current critical data 10c may be modified and/or replaced when the user decides to select new data 10 for sending by means of the control entity A. Depending on circumstances, the current data 10c may be in the format for data reception by the onboard entity, or else it is preferably in the third format as generated when the onboard entity B1 performs verification.

As shown in FIG. 2c, and in response to the information signal S, the operator may optionally act on the validation means E, which are preferably means that have been certified in compliance with a criticality standard and which are connected to the control entity A.

Means 16 for generating an intention message 21 and installed in the control entity A are then actuated by the operator acting on the validation means E. The intention message 21 and/or the validated data corresponding to the message 21 may be stored in storage means installed in the control entity A and/or in a peripheral connected to the control entity A, e.g. a peripheral of the human-machine interface C. The digital integrity of the message 21 or of the data contained in the message 21 may be verified, e.g. by the means 16 for generating the intention message. This verification of digital integrity may be performed by means of a checksum function. In addition to this integrity verification, the message generator means 16 may also be arranged to proceed with inscription and/or signature and/or time stamping the data of the message 21. The data of the message 21 or the encrypted message 21 can then be stored in storage means of the human-machine entity C and/or in storage means of the control entity A. An advantageous use of this storage of the message 21 is given below.

Preferably, the encryption is such that only the control entity A and possibly the onboard entity B1 can decrypt and reuse the data without requiring additional validation.

The intention message 21 generated by the means 16 is transmitted from the control entity A to the onboard entity B1. On receiving this intention message 21, if the message is a validation message, then the onboard entity B1 controls modification or replacement of the current data 10c by the data 10 previously stored in the storage means 12.

The corresponding actions may then be executed and by way of example the drone may follow a new path or go to a new position.

In contrast, if the operator considers that the information signal S represents data 10 that is different from the data previously selected by the operator, then it can be deduced that the data has been corrupted and the operator does not perform the validation action. When the intention message 21 is a validation message, the validation message is not generated and the critical current data 10c is not modified in the current storage means 14.

When the intention message 21 is a cancel message, then on receiving this message 21 the onboard entity B1 prevents modification of the critical current data 10c in the current storage means 14 or causes an emergency procedure to be executed as previously stored in the onboard entity B1.

Such an emergency procedure stored in the onboard entity B1 may be performed if no intention message 21 has been received after some predetermined duration. This predetermined duration may be measured using a clock of the onboard entity. This measurement may be started on the onboard entity B1 receiving the data or on the message 20 being sent from the onboard entity to the control entity.

This measurement is interrupted and reinitialized in the event of an intention message 21 being received.

It should be observed that in the absence of reception of data sent by the control unit, the onboard message B1 may engage said emergency procedure at the end of a predetermined length of time.

The emergency procedure may consist in loading an emergency path to be followed or in loading an emergency destination position for the drone.

It should be observed that means for starting the emergency procedure (not shown) may be connected to the control entity in order to enable the operator to activate them, e.g. via the human-machine interface and/or via said validation means E.

It should be observed that the validation means E may include a button that is certified in compliance with the criticality standard.

The frequency with which this button is pressed or the length of time it is pressed may determine whether the means for starting the emergency procedure are activated.

Alternatively, a button that is specific for activating the emergency procedure may be connected to the means for starting this emergency procedure. Ideally, such specific means should also be certified in compliance with the criticality standard.

In a particular implementation, the human-machine interface C may be arranged so that the backed-up copy of the message 21 as previously encrypted, time-stamped, and signed by the control entity A can be sent to the onboard entity B1 on an order from the operator delivered via the human-machine interface C. Under such circumstances, the control entity A may respond to an order from the human-machine interface C by transmitting the message 21 to the onboard entity B1. As described above, the onboard entity B1 causes the current data 10c to be modified or to be replaced by the data 10 previously stored in the storage means 12 and corresponding to the message 21 sent in response to the order from the human-machine interface C. Thus, the actions corresponding to this message 21 transmitted in response to an order from the human-machine interface C are executed directly by the drone B, without needing to be validated again via the validation means E.

Specifically, since the message 21 has already been validated by the validation means E, the onboard entity B1 considers the message 21 as if it had been transmitted directly by the control entity A without there being any order to execute the message 21 passing via the human-machine interface C. The actions are thus executed directly without requesting additional validation, with this applying even if the order comes from the human-machine interface C.

The invention claimed is:

1. A system comprising a drone having an onboard entity on board said drone and a control entity for controlling the drone and situated remotely from the drone, the control entity being connected to a human-machine interface adapted to enable an operator to select instructions for sending from the control entity to the onboard entity, the onboard entity receiving the instructions sent by the control entity and executing actions corresponding to the instructions received by the onboard entity, wherein:
   the onboard entity generates a message from the instructions received by the onboard entity and transmits this message to the control entity; and
   the control entity controls warning means to generate an information signal representative of said message transmitted by the onboard entity and received by the control entity;
   the system further comprising validation means connected to the control entity, the control entity generating an intention message in response to a command exerted by the operator on said validation means after said information signal has been generated and transmitting said intention message to the onboard entity; and
   the onboard entity conditioning the execution of said actions as a function of said intention message, which actions correspond to the instructions previously received by the onboard entity.

2. The system according to claim 1, wherein the human-machine interface comprises:
   selection means selected from hand-controlled selection means and voice-controlled selection means; and
   at least one display means for displaying the instructions selected using the human-machine interface; and
   the warning means include a loudspeaker for delivering said information signal representative of said message, the information signal then being a signal of audio type, and/or a visual display for displaying the information signal, the information signal then being of text type.

3. The system according to claim 2, wherein the control entity includes an interpretation device arranged to interpret the message generated by the onboard entity and to deliver a text-type interpreted message to the warning means, said warning means including a voice synthesis device, said information signal representative of the message transmitted by the onboard entity being an audio voice signal synthesized by the voice synthesis device on the basis of said text-type interpreted message.

4. The system according to claim 1, wherein the instructions selected by the operator are instructions having an influence on a change in the position or the path of the drone or are instructions that are critical for various flight functions of the drone.

5. The system according to claim 1, wherein the control entity further includes a verification device arranged to verify the digital and semantic integrity of the instructions selected by the operator using the human-machine interface.

6. The system according to claim 1, wherein the onboard entity further includes a verification device arranged to verify the digital and/or semantic integrity of the instructions received by the onboard entity.

7. The system according to claim 1, wherein the onboard entity includes storage means for storing the received instructions as sent by the control entity.

8. A method of communication between a control entity for controlling a drone situated remotely from the drone and an onboard entity on board said drone, the control entity being connected to a human-machine interface in order to enable an operator to select instructions for sending from the control entity to the onboard entity, the method comprising:
   by the onboard entity, receiving the instructions sent by the control entity;
   by the onboard entity, transmitting a message to the control entity, the message being generated from the instructions received by the onboard entity;
   by the control entity, controlling warning means to generate an information signal for the attention of the operator, the information signal being representative of said message transmitted by the onboard entity and received by the control entity;
   by the control entity, transmitting an intention message to the onboard entity as a function of a command exerted by the operator on said validation means connected to the control entity; and
   by the onboard entity, executing said actions that correspond to the instructions previously received by the onboard entity as a function of said intention message.

9. The method of communication according to claim 8, wherein the human-machine interface includes:
   selection means selected from hand-controlled selection means and voice-controlled selection means; and
   at least one display means for displaying the instructions selected using the human-machine interface; and
   the warning means including a loudspeaker for delivering said information signal for the attention of the operator, the information signal then being a signal of audio type, and/or a visual display for displaying the information signal, the information signal then being of text type.

* * * * *